United States Patent [19]

Sticht et al.

[11] Patent Number: 4,483,219
[45] Date of Patent: Nov. 20, 1984

[54] SCREW DRIVING APPARATUS

[75] Inventors: Walter Sticht; Gerhard Schwankhart, both of Attnang, Austria

[73] Assignee: Stiwa-Fertigungstechnik Sticht Gesellschaft M.B.H., Attnang, Austria

[21] Appl. No.: 468,167

[22] Filed: Feb. 22, 1983

[30] Foreign Application Priority Data

Mar. 5, 1982 [AT] Austria ................................. 865/82

[51] Int. Cl.³ ............................................. B25B 23/00
[52] U.S. Cl. .................. 81/57.14; 81/57.24; 81/57.3; 81/57.4
[58] Field of Search ................. 81/57.11, 57.14, 57.24, 81/57.3, 57.4, 57.37, 430–435; 73/163

[56] References Cited

U.S. PATENT DOCUMENTS 2,314,760 3/1943 Blair ..................................... 81/57.3
2,605,792 8/1952 Havener ............................... 81/57.4
2,961,019 11/1960 Dixon ................................... 81/57.4
3,561,508 2/1971 Holzwarth ......................... 81/57.37

*Primary Examiner*—James L. Jones, Jr.
*Attorney, Agent, or Firm*—Kurt Kelman

[57] ABSTRACT

An apparatus for driving a screw into a workpiece, which comprises a support stand, a rotating drive mounted on the support stand, a replaceable flywheel mass, a coupling between the rotating drive and the flywheel mass for transmitting a rotary motion from the drive to the flywheel mass, a holder for a screwdriver keyed to the flywheel mass for rotation therewith whereby the screw may be driven into the workpiece in a screw driving direction, an adjustment drive for adjustably positioning the holder in relation to the rotating drive in said direction, a device for blocking a recoil of the holder in a direction opposite to the screw driving direction, the recoil blocking device being arranged between the support stand and the holder, and a control for selectively operating the recoil blocking device at least during the recoil of the holder.

16 Claims, 5 Drawing Figures

SCREW DRIVING APPARATUS

The present invention relates to improvements in an apparatus for driving a screw into a workpiece, which comprises a support stand, a rotating drive mounted on the support stand, a flywheel mass, a coupling for transmitting a rotary motion from the drive, a holder for a screwdriver whereby the screw may be driven into the workpiece in a screw driving direction, and an adjustment drive for adjustably positioning the holder in relation to the rotating drive in said direction.

Apparatus of this general type with mechanical or electro-mechanical controls for limiting the tightening force to attain a desired torque is known. Such known screw driving apparatus has electro-motor or fluid pressure drives rotating a flywheel mass to which the screwdriver is keyed. The motion transmitting coupling between the rotating drive and the screwdriver is disconnected when a pre-set torque has been reached. The screwdriver is usually advanced by a pressure fluid drive, the pressure fluid most frequently being compressed air. It is almost unavoidable to prevent the forward edge of the screwdriver from slipping out of engagement with the slot in the screwhead as the screw is applied to the workpiece and the screwdriver begins to turn to advance in the screw driving direction because of the increased resistance encountered at this point, particularly in the case of a Phillips screw where the cross-shaped slot does not extend to the rim of the screwhead and/or where the slot may be at least partially covered by residual lacquer or paint coatings. This slippage between the screwdriver and the screwhead often damages or even destroys the screwhead. To avoid this, for forward force of the screwdriver holder is often set so high that it overcomes this resistance. This, however, often causes the first threads of the screw to be destroyed, particularly in cases of screws used in electrical applications, which are made of relatively soft metals, such as brass, copper or the like.

It is the primary object of this invention to provide a screw driving apparatus of the indicated type which assures a dependable screwdriving operation without damage to the screw threads or the screwhead with a relatively weak forward force of the screwdriver. It is another object of the invention to assure attainment of an adjustable torque and to enable this torque to be rapidly adjusted according to prevailing operating conditions while keeping the structure of the apparatus simple.

The above and other objects are accomplished according to the present invention in such a screw driving apparatus with a replaceable flywheel mass, the coupling being arranged between the rotating drive and the flywheel mass for transmitting a rotary motion from the drive to the flywheel mass and the screwdriver holder being keyed to the flywheel mass for rotation therewith, and this apparatus further comprising a device for blocking a recoil of the holder in a direction opposite to the driving direction, the recoil blocking device being arranged between the support stand and the holder, and a control for selectively operating the recoil blocking device at least during the recoil of the holder.

This very simple structural modification surprisingly avoids the displacement of the screwdriver holder in a direction opposite to the driving direction while maintaining the simple structure of the apparatus and using the conventional pneumatic drives. Damage to the screwhead during the initial tightening as well as during the final tightening of the screw with the required torque is thus avoided. At the same time, the indicated arrangement of the replaceable flywheel mass assures a uniform screwdriving force during the entire time the screw is turned, the arrangement of the coupling between the rotating drive and the flywheel mass enabling the flywheel mass to be used also for limiting the torque, i.e. the tightening force of the screw. The control makes it possible to activate the recoil blocking device only while the screwdriver holder is advanced in the screw driving direction while assuring a quick return thereof into its rest position after the screw has been tightened.

The above and other objects, advantages and features of this invention will be better understood from the following detailed description of certain now preferred embodiments of an apparatus for driving a screw into a workpiece, taken in conjunction with the accompanying, partially schematic drawing wherein FIG. 1 is a side elevational view of a screw driving apparatus in an assembly machine;

Figure 1:
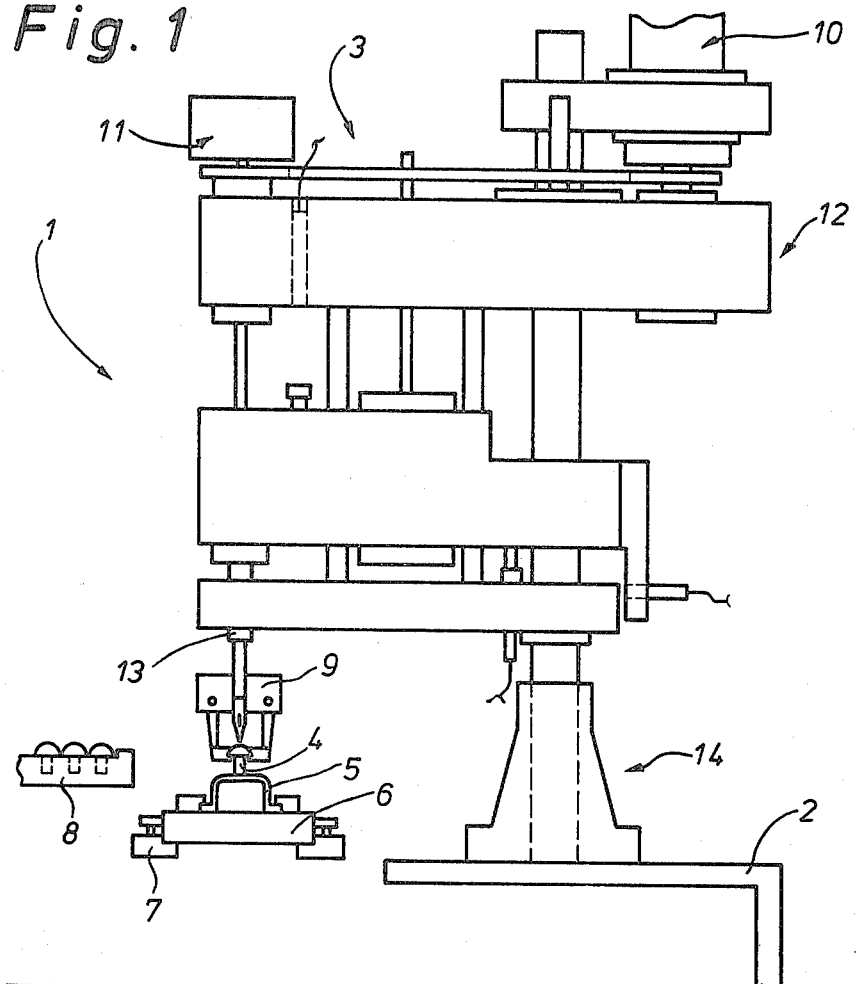

Referring now to the drawing and first to FIG. 1, there is shown assembly machine 1, which may be a part of a fully automatic assembly line, and comprises apparatus 3 for driving screw 4 into workpiece 5 which is held on pallet 6 which may be moved along conveyor 7 in the direction of the longitudinal extension of machine table 2. Handling device 9 on the machine table feeds screws 4 from singling and conveying device 8 to workpiece 5.

Screw driving apparatus 3 comprises support stand 14 mounted on machine table 2, rotating drive 10 mounted on the support stand, replaceable flywheel mass 11, housing 12 mounted on support stand 14 and carrying rotating drive 10 and flywheel mass 11, and holder 13 for a screwdriver, the holder being vertically adjustably positionable in relation to the housing.

Figure 2:
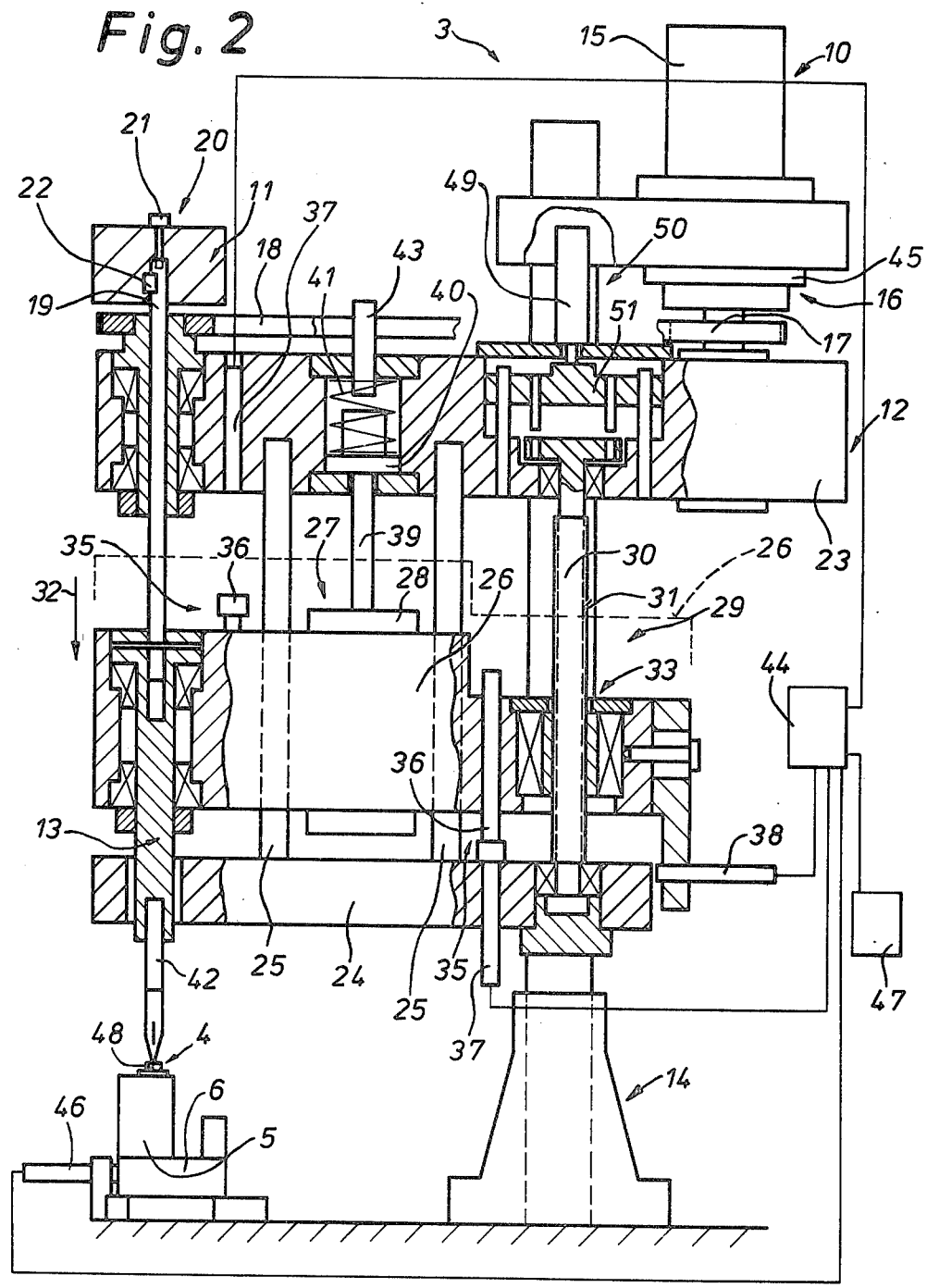
FIG. 2 shows the apparatus of FIG. 1 on an enlarged scale and partially in section, with the associated control.

FIG. 2 shows the structural details of screwdriving apparatus 3. As illustrated, housing 12 is vertically adjustably mounted on support stand 14 and carries drive 10, for example electro-motor 15. Coupling 16 between the rotating drive and the flywheel mass transmits a rotary motion from drive 10 to flywheel mass 11 by means of a transmission comprising sprocket 17 keyed to the shaft of the electro-motor, another sprocket keyed to drive shaft 19 and transmission belt 18 trained over the two sprockets. The coupling is preferably electromagnetically remote-controlled. Flywheel mass 11 is replaceably mounted on one end of drive shaft 19 by means of a fixing device, such as illustrated screw 21 holding the flywheel mass on the drive shaft end against the bias of spring 22 arranged in a recess between the drive shaft and the flywheel mass. Holder 13 constituted by a socket for screwdriver 42 is preferably detachably affixed to the opposite end of drive shaft 19 so as to be keyed to flywheel mass 11 for rotation therewith whereby screw 4 may be driven into workpiece 5 in a screw driving direction. In the illustrated embodiment, carrier 26 is mounted on support stand 14 and carries holder 13. The screwdriver may be adapted for driving Phillips screws and by detachably affixing the holder to the drive shaft, it is possible readily to adapt the apparatus for the use of various types of screws.

Housing 12 is comprised of two housing parts 23, 24 spaced from each other by guide columns 25 which interconnect the two housing parts. Carrier 26 is mounted on the guide columns of housing 12 and carries screwdriver holder 13. Adjustment drive 27, which is illustrated as cylinder-piston drive 28, connects the carrier for the screwdriver holder to housing part 23 so that the holder is adjustably positioned in relation to rotating drive 10, which is carried by housing 12 mounted on support stand 14, in the screwdriving direction. Device 29 for blocking a recoil of holder 13 in a direction opposite to the screwdriving direction is arranged between the support stand and the holder, this recoil blocking device being arranged in the illustrated embodiment between housing 12 and carrier 26, and extending substantially parallel to adjustment drive 27. The recoil blocking device illustrated in FIG. 2 comprises spindle 30 having a coarse thread and a unidirectional coupling 33 connecting spindle 30 to carrier 26. The coupling permits an idling motion between the spindle and the carrier in the screwdriving direction indicated by arrow 32. The spindle is rotatably journaled in fixing device 50.

This simple mechanical structure enables the recoil blocking device to be fully effective under unfavorable environmental conditions, such as in assembly lines subjected to dust or even corrosive vapor conditions, without requiring much, if any, maintenance. All the parts are readily replaceable and the adjustment drive is such that it may be mounted on existing screwdriving machines.

By mounting flywheel mass 11 replaceably on drive shaft 19 for the screwdriver holder, the apparatus may be universally used for various screws and different torque conditions.

Adjustable stop means 35 are associated with carrier 26 for limiting the stroke of the carrier and holder, the stop means being comprised of adjustable abutments 36 facing housing parts 23, 24. Limit switch means 37 are arranged for cooperation with the stop means, the illustrated switch means being comprised of electromagnetic proximity fuses sensing the engagement of abutments 36 with housing parts 23, 24. This arrangement accurately limits the two end positions of carrier 26 and screwdriver holder 13 carried thereby without damage to housing 12 since the limit switch means may be used for dependably controlling the associated adjustment drives.

For a purpose to be described hereinafter, further limit switch means 38, which also may be an electromagnetic proxity fuse, i.e. a so-called pulsor, is arranged on a bracket of carrier 26 for cooperation with housing part 24.

Piston rod 39 of cylinder-piston drive 28 carries gliding element 40 at an outer end thereof and is thus glidably mounted in a recess in housing part 23 for movement in a direction opposite to the screwdriving direction indicated by arrow 32, compression spring 41 being arranged in the housing part recess for biasing gliding element 40 and piston rod 39 in this direction. In this manner, screwdriver holder 13 carried by carrier 26 is yieldingly mounted in relation to housing 12. Adjustable stop bolt 43 engages gliding element 40 after it has overcome the bias of compression spring 41 and the compression spring may be exchangeable for a spring of different bias. In this manner, the force applied by holder 13 to screwdriver 42 engaging screw 4 for driving the screw into workpiece 5 may be suitably adjusted. This assures dependable engagement of the screwdriver with the slot in the screwhead or of a holder socket with a hexagonal screwhead without having to increase the force of the adjustment drive unduly, which could damage the screwhead.

The hereinabove described apparatus operates in the following manner:

A control circuit connects central control 44 to rotating drive 10, adjustment drive 27 and electromagnet 46 of coupling 16 for operating the drives and engaging the coupling so as to turn drive shaft 19 and to advance screwdriver 42 in the direction of arrow 32. At the beginning of the screwdriving operation, carrier 26 is in the upper end position indicated in broken lines in FIG. 2.

The control circuit also connects limit switch 46 to central control 44 to transmit thereto a control signal when pallet 6 carrying workpiece 5 has placed the workpiece in the range of apparatus 3 for turning screw 4. This will cause handling device 9 to place a screw on the workpiece. When screw 4 is properly positioned on workpiece 5, control 47 will send a starting signal to central control 44 to turn on electromotor 15, energize electromagnet 45 for engaging coupling 16, and immediately thereafter to actuate drive 27 so that screwdriver 42 will be turned while its carrier 26 moves it by gravity towards screw 4. If a Phillips screw is used, the screwdriver must be centered in the cross-shaped slot of screwhead 48 when it contacts the screwhead and, as long as the screwdriver does not engage the slot, the screw cannot be turned and carrier 26 is, therefore, blocked in its movement in the direction of arrow 32. Therefore, piston rod 39 moves up into housing part 23 against the bias of spring 41 while compressing the same. This, in turn, steadily increases the downward pressure against the screwdriver until the same has become sufficient to force the screwdriver to slip into the slot in the screwhead for engagement therewith. If desired, central control 44 may include a time-delay element to take this initial screwdriver positioning manoever into account and this element may be set for a corresponding delay in time for starting turning of the screwdriver. At the end of this time delay, cylinder-piston drive 49 of fixing device 50 may be operated to engage blocking part 51 with spindle 30, the blocking part being glidably guided in a recess in housing part 23 and having pins in alignment with bores in a disc attached to an end of the spindle for engagement of the pins in the bores when drive 49 moves the blocking part against the disc. If no time delay is incorporated into the central control, limit switch 38 will transmit a control signal to central control 44, which is connected thereto by the control circuit, to actuate motor 15, thus avoiding damage to the screwhead by slippage of the screwdriver during tightening of the screw to attain the required torque. Engagement of blocking device 51 with the spindle disc fixes spindle 30 against rotation in relation to housing 12.

Fixing spindle 30 against rotation activates recoil blocking device 29, i.e. it makes idling motion 33 effective. This prevents screwdriver 42 from slipping out of engagement with the slot in screwhead 48 against the screwdriving direction indicated by arrow 32 when the turning of screw 4 in workpiece 5 encounters increased resistance, for example during the first turns of the screw when the workpiece is coated with lacquer or a like surface layer. The idling motion permits the screwdriver to move only forwardly in the direction of arrow 32. This prevents any damage to the slot in the screwhead during the first turns of the screw as well as during the final tightening of the screw, which is of particular advantage in the case of screws of non-ferrous metals, such as brass screws, copper screws and the like, which may be subjected to the full torque required for tightening the screw and determined by the weight of flywheel mass 11 without damage to the screw. Immediately before abutment 36 contacts housing part 24 at the end of the screwdriving operation, limit switch 38 mounted on carrier 26 will transmit a control signal to central control 44, causing the central control to de-energize electromagnet 45 of coupling 16. In this manner, rotating drive 10 is disconnected from drive shaft 19 and the latter will be rotated only by the momentum of flywheel mass 11 for the end turns of screw 4 in workpiece 5. This avoids subjecting the screw to excessive loads which could lead to damage or even destruction of the screw or screwhead. At the same time, the flywheel mass operating without rotating drive 10 will assure that the screw is subjected to a uniform torque during the final tightening of the screw. The control signal may also be used for actuating cylinder-piston drive 49 of fixing device 50.

To enable the final screw tightening torque to be accurately set at the end of the downward stroke of carrier 26 until abutment 36 contacts housing part 24, limit switch 38 may be vertically adjustably mounted in an elongated slot in the carrier. The described arrangement makes it possible simply and exactly to set the stroke of the screwdriver holder during which the screw is turned exclusively by the flywheel mass which predetermines the desired torque.

When abutment 36 contacts housing part 24, limit switch 37 in this housing part will send a control signal to central control 44 to operate drive 49 so as to lift blocking part 51 out of engagement with spindle 30. This unblocks the spindle so as to enable it to rotate and to make idling motion 33 ineffective. Adjustment drive 27, which is operated by control 44, is, therefore, able to retract carrier 26 to return it to its starting position indicated in broken lines, central control 44 having de-activated recoil blocking device 29.

Figure 3:
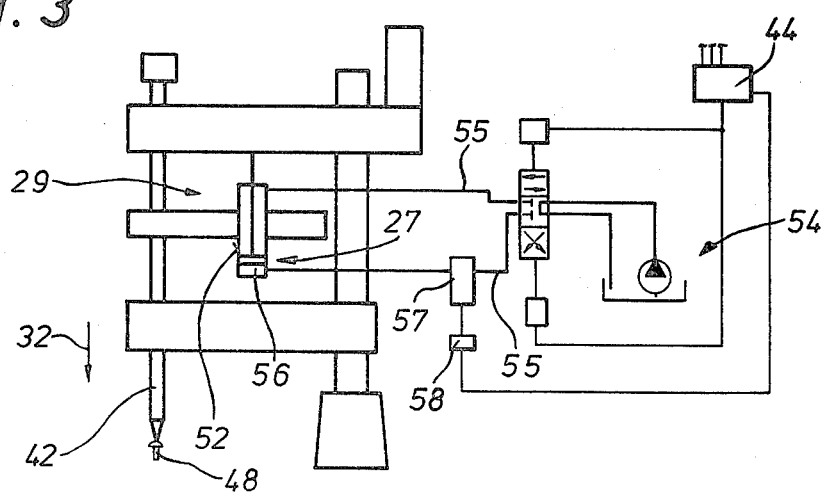
FIG. 3 shows an embodiment of a recoil blocking device and the associated control circuit diagram in a highly schematic illustration.

FIG. 3 schematically illustrates an embodiment wherein recoil blocking device 29 comprises hydraulically operable cylinder-piston device 52. In this embodiment, device 52 also constitutes adjustment drive 27 so that the drive for adjustably positioning the holder for screwdriver 42 and the recoil blocking device are integrated. This arrangement is particularly free of maintenance problems and robust, being comprised of few components. The cylinder of device 52 defines chamber 56 connected by conduit 55 of hydraulic system 54 to a source of hydraulic fluid, and unblocking drive 58 includes check valve 57 between the hydraulic fluid source and cylinder chamber 56 for supplying hydraulic fluid to the chamber. Central control 44 is connected to unblocking drive 58 for selectively operating check valve 57. After screwdriver 42 has been brought into engagement with the slot in screwhead 48, the check valve is closed through control 44 so that the screwdriver cannot recoil in a direction opposite to screwdriving direction 32 and the screwdriver cannot become disengaged from the screwhead because the hydraulic fluid in the cylinder chambers cannot be compressed. After the screwdriving operation has been completed, central control 44 will operate drive 58 to open the check valve so that adjustment drive 27 may return the screwdriver holder to its starting position.

Figure 4:
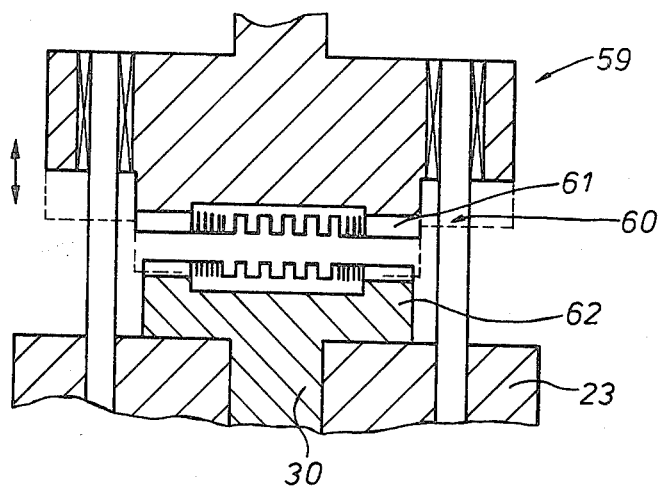
FIG. 4 illustrates an embodiment of a fixing device for the recoil blocking device, in section.

FIG. 4 illustrates another embodiment of a device 59 for fixing spindle 30 relative to housing part 23. Fixing device 59 is constituted by coupling gear 60 instead of the interengaging pins and bores shown in FIG. 2. The use of a coupling gear locking coupling part 62 of spindle 30 to coupling part 61 of the fixing device has the advantage that the spindle is held against rotation instantaneously upon operation of fixing device 59 since the many gear teeth will be capable of interengaging in almost any rotary position of the coupling parts.

Figure 5:
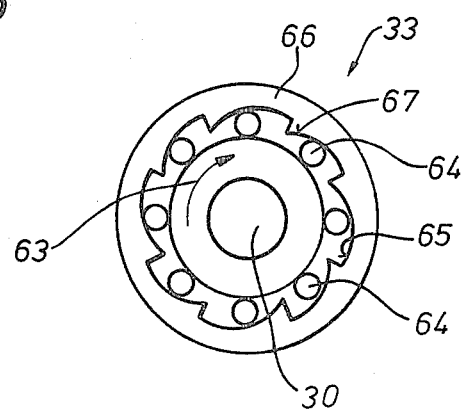
FIG. 5 is a top view of an idling motion device constituting the recoil blocking device.

Idling motion device 33 is shown on an enlarged scale in FIG. 5. This unidirectional coupling operates in the following manner:

When spindle 30 is rotated in the direction of arcuate arrow 63, cylindrical roller bearings 64 may turn freely in recesses 65 of outer run 66 of device 33. When there is a relative movement between spindle 30 and outer run 66 opposite to the direction 63, the roller bearings will be jammed between the spindle and narrowed spaces 67 of recesses 65 to block rotation of the spindle. Combined with coarse thread 31 of spindle 30 and the rotary journaling of outer run 66 in carrier 26, this will prevent a recoil of the screwdriver in a direction opposite to the screwdriving direction indicated by arrow 32.

While the present invention has been described in connection with certain now preferred embodiments thereof, it will be understood that those skilled in the art may be able to devise many modifications and variations of particular structural components operating in an equivalent manner without departing from the spirit and scope of this invention as defined in the appended claims.

What is claimed is:

1. An apparatus for driving a screw into a workpiece, which comprises
   (a) a support stand,
   (b) a rotating drive mounted on the support stand,
   (c) a replaceable flywheel mass,
   (d) a coupling between the rotating drive and the flywheel mass for transmitting a rotary motion from the drive to the flywheel mass,
   (e) a holder for a screwdriver keyed to the flywheel mass for rotation therewith whereby the screw may be driven into the workpiece in a screw driving direction,
   (f) an adjustment drive for adjustably positioning the holder in relation to the rotating drive in said direction,
   (g) a device for blocking a recoil of the holder in a direction opposite to the screw driving direction, the recoil blocking device being arranged between the support stand and the holder, and
   (h) a control for selectively operating the recoil blocking device at least during the recoil of the holder.

2. The screw driving apparatus of claim 1, further comprising a housing mounted on the support stand and carrying the rotating drive and the flywheel mass, and a carrier mounted on the housing and carrying the holder, the recoil blocking device being arranged between the housing and the carrier, and the blocking device extending substantially parallel to the adjustment drive.

3. The screw driving apparatus of claim 2, wherein the adjustment drive is a cylinder-piston drive.

4. The screw driving apparatus of claim 2, wherein the recoil blocking device comprises a spindle having a coarse thread and a unidirectional coupling connecting the spindle to the carrier, the coupling permitting an idling motion between the spindle and carrier in the screw driving direction, and further comprising a fixing device in the housing, the spindle being rotatably journaled in the fixing device.

5. The screw driving apparatus of claim 1, further comprising a drive shaft for the holder, the flywheel mass being replaceably mounted on the drive shaft.

6. The screw driving apparatus of claim 1, further comprising a carrier mounted on the housing and carrying the holder, adjustable stop means associated with the carrier for limiting the stroke of the carrier and holder, and limiting switch means arranged for cooperation with the stop means.

7. The screw driving apparatus of claim 6, wherein the limiting switch means is constituted by electromagnetic proximity fuses.

8. The screw driving apparatus of claim 6, further comprising a limiting switch element mounted on the carrier, the limiting switch element being arranged to generate a control signal before the stop means limits the stroke in the screw driving direction, the limiting switch element being connected to the control for transmitting the control signal thereto.

9. The screw driving apparatus of claim 8, further comprising a housing mounted on the support stand and carrying the rotating drive and the flywheel mass, a carrier mounted on the housing and carrying the holder, the recoil blocking device being arranged between the housing and the carrier, the blocking device extending substantially parallel to the adjustment drive and comprising a spindle having a coarse thread and a unidirectional coupling connecting the spindle to the carrier, the coupling permitting an idling motion between the spindle and carrier in the screw driving direction, and further comprising a fixing device including a cylinder-piston drive in the housing, the spindle being rotatably journaled in the fixing device, and the control being connected to the coupling and to the cylinder-piston drive.

10. The screw driving apparatus of claim 1, wherein the recoil blocking device comprises a hydraulically operable cylinder-piston device, the cylinder of the device defining a chamber connected to a source of hydraulic fluid, and an unblocking drive including a check valve between the hydraulic fluid source and the cylinder chamber for supplying hydraulic fluid to the chamber.

11. The screw driving apparatus of claim 1, wherein the adjustment drive and the recoil blocking device are integrated.

12. The screw driving apparatus of claim 1, further comprising a drive shaft for the holder and the holder being detachably affixed to the drive shaft.

13. The screw driving apparatus of claim 1, wherein the screwdriver is adapted for driving Phillips screws.

14. The screw driving apparatus of claim 1, further comprising a housing mounted on the support stand and carrying the rotating drive and the flywheel mass, a carrier mounted on the housing and carrying the holder, and a compression spring arranged between the housing and the carrier for yieldingly mounting the holder in relation to the housing.

15. The screw driving apparatus of claim 14, further comprising an adjustable stop bolt engaging the compression spring for adjusting the bias thereof.

16. The screw driving apparatus of claim 14, wherein the compression spring is exchangeable for a spring of different bias.

* * * * *